(12) United States Patent
Maeyama et al.

(10) Patent No.: US 11,791,452 B2
(45) Date of Patent: Oct. 17, 2023

(54) POSITIVE ELECTRODE FOR SOLID-STATE BATTERIES, SOLID-STATE BATTERY AND METHOD FOR PRODUCING SOLID-STATE BATTERY

(71) Applicant: HONDA MOTOR CO., LTD., Tokyo (JP)

(72) Inventors: Hiroto Maeyama, Saitama (JP); Ushio Harada, Saitama (JP); Noriaki Kamaya, Saitama (JP); Sokichi Okubo, Saitama (JP); Toru Sukigara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 16/965,600

(22) PCT Filed: Feb. 2, 2018

(86) PCT No.: PCT/JP2018/003650
§ 371 (c)(1),
(2) Date: Jul. 29, 2020

(87) PCT Pub. No.: WO2019/150559
PCT Pub. Date: Aug. 8, 2019

(65) Prior Publication Data
US 2021/0043918 A1  Feb. 11, 2021

(51) Int. Cl.
*H01M 4/131* (2010.01)
*H01M 4/36* (2006.01)
(Continued)

(52) U.S. Cl.
CPC ........... *H01M 4/131* (2013.01); *H01M 4/362* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2007/0160911 A1 7/2007 Senga et al.
2010/0112449 A1 5/2010 Fujita et al.
(Continued)

FOREIGN PATENT DOCUMENTS

CN  101647139 A  2/2010
JP  2002075367 A  3/2002
(Continued)

OTHER PUBLICATIONS

Machine Translation of: JP 2015-005398 A, Ishigaki et al., Jan. 8, 2015.*

(Continued)

*Primary Examiner* — Kenneth J Douyette
(74) *Attorney, Agent, or Firm* — CKC & Partners Co., LLC

(57) ABSTRACT

Provided are: a positive electrode for solid-state batteries, which enables the achievement of high energy density, rate characteristics and durability; a solid-state battery; and a method for producing a solid-state battery.

A positive electrode for solid-state batteries, which is provided with a collector and a positive electrode active material layer that contains a positive electrode active material, and which is configured such that: the ratio of the positive electrode active material, which is composed of primary particles, in the positive electrode active material layer is 60% by mass or more; the void fraction in the positive electrode active material layer is less than 20% by volume; and portions of the positive electrode active material layer other than the positive electrode active material, which is composed of primary particles, contain a solid electrolyte. The present invention also provides: a solid-state battery (Continued)

which comprises this positive electrode for solid-state batteries; and a method for producing this solid-state battery.

15 Claims, 3 Drawing Sheets

(51) Int. Cl.
| | |
|---|---|
| H01M 4/50 | (2010.01) |
| H01M 10/04 | (2006.01) |
| H01M 10/05 | (2010.01) |
| H01M 4/505 | (2010.01) |
| H01M 4/525 | (2010.01) |
| H01M 10/0585 | (2010.01) |
| H01M 4/02 | (2006.01) |

(52) U.S. Cl.
CPC ..... *H01M 10/049* (2013.01); *H01M 10/0468* (2013.01); *H01M 10/05* (2013.01); *H01M 10/0585* (2013.01); *H01M 2004/021* (2013.01); *H01M 2004/028* (2013.01)

(56) References Cited

U.S. PATENT DOCUMENTS

2012/0270107 A1  10/2012  Toya et al.
2015/0072232 A1*  3/2015  Nagai ............... H01M 10/0525
                                                   429/231
2015/0194719 A1  7/2015  Nishimura et al.
2017/0352916 A1  12/2017  Miyashita et al.

FOREIGN PATENT DOCUMENTS

| JP | 2003292322 A | 10/2003 |
|---|---|---|
| JP | 2005228570 A | 8/2005 |
| JP | 2006012433 A | 1/2006 |
| JP | 2008270175 A | 11/2008 |
| JP | 2010219065 A * | 9/2010 |
| JP | 2011116580 A | 6/2011 |
| JP | 2011146390 A | 7/2011 |
| JP | 2015005398 A | 1/2015 |
| JP | 5742935 B2 | 7/2015 |
| JP | 2015130247 A | 7/2015 |
| JP | 5985120 B1 | 9/2016 |
| JP | 6098612 B2 | 3/2017 |
| KR | 20090120506 A | 11/2009 |
| TW | 200924263 A | 6/2009 |
| WO | 2008120442 A1 | 10/2008 |
| WO | 2009038037 A1 | 3/2009 |

OTHER PUBLICATIONS

Machine Translation of: JP 2010-219065A, Kobayashi et al., Sep. 2010.*

* cited by examiner

POSITIVE ELECTRODE FOR SOLID-STATE BATTERIES, SOLID-STATE BATTERY AND METHOD FOR PRODUCING SOLID-STATE BATTERY

TECHNICAL FIELD

The present invention relates to a positive electrode for solid-state batteries, a solid-state battery, and a method for producing a solid-state battery.

BACKGROUND ART

In recent years, a solid-state battery has been under development, which is obtained by replacing, with a solid electrolyte, a liquid electrolyte in a lithium-ion secondary battery that is widely used in electric vehicles and hybrid vehicles, and thus making the battery all-solid.

The solid-state battery is of interest due to its reducible size and weight as well as its high power and capacity compared to conventional lithium-ion secondary batteries.

Positive electrode active material particles for a solid-state battery that contain a sulfide-based solid electrolyte, for example, have been proposed (see, for example, Patent Document 1).

The positive electrode active material particles are each composed of an aggregate of at least two particles and a reaction suppressing layer coating a surface of the aggregate for suppressing a reaction with the sulfide-based solid electrolyte.

This is considered to help inhibit a reduction in performance of the solid-state battery due to formation of a high-resistance region through a reaction at an interface between an active material and the sulfide-based solid electrolyte leading to an increase in interfacial resistance.

Also, composite particles for a solid-state battery electrode have been proposed (see, for example, Patent Document 2).

The composite particles include a plurality of active material particles and an oxide solid electrolyte between the particles. This is considered to help obtain a high-power solid-state battery.

Patent Document 1: Japanese Patent No. 5742935
Patent Document 2: Japanese Patent No. 6098612

DISCLOSURE OF THE INVENTION

Problems to be Solved by the Invention

In order to increase the energy density of a solid-state battery, incidentally, it is necessary to increase the blend ratio of an active material in an electrode therein. However, the positive electrode active material particles disclosed in Patent Document 1 and the composite particles disclosed in Patent Document 2 would disintegrate and fail to sufficiently form an ion path for the solid electrolyte if the blend ratio of the active material in the electrode is increased and pressurization at a high pressure is performed thereon for satisfactory contact with the solid electrolyte. Furthermore, the disintegration of the particles disrupts inter-active material electron conduction and ion conduction. As a result, the ratio of the active material failing to be effectively used increases, preventing the solid-state battery from achieving a high energy density despite the high blend ratio of the active material.

Furthermore, coating the surface of the active material is effective for improvement in durability.

For this purpose, the surface of the aggregate in each of the positive electrode active material particles disclosed in Patent Document 1 is coated with the reaction suppressing layer. However, as described above, the active material particles would disintegrate if the blend ratio of the active material in the electrode is increased and pressurization at a high pressure is performed thereon, causing some uncoated portions to be exposed.

As a result, the reaction suppressing layer fails to sufficiently function, and the durability decreases.

Furthermore, in a case where secondary particles are used as active material particles as in the case of Patent Documents 1 and 2, primary particles composing the secondary particles expand and contract during charging and discharging to cause the secondary particles to disintegrate at grain boundaries of the primary particles, leaving voids.

As a result, the solid-state battery deteriorates as the ion path is lost with charge-discharge cycles.

Unlike lithium-ion batteries, the solid-state battery significantly deteriorates when the disintegration occurs in the active material particles, because the ion path cannot be ensured due to the lack of penetration of an electrolyte in such a situation.

It has been therefore desired to develop a solid-state battery that achieves a high energy density, a high rate capability, and high durability.

The present invention was achieved in consideration of the above-described circumstances, and an objective thereof is to provide a positive electrode for solid-state batteries, a solid-state battery, and a method for producing a positive electrode for solid-state batteries that achieve a high energy density, a high rate capability, and high durability.

Means for Solving the Problems (1) In order to achieve the objective described above, the present invention provides a positive electrode for solid-state batteries that includes a current collector and a positive electrode active material layer containing a positive electrode active material. The positive electrode active material is composed of primary particles. The positive electrode active material layer contains the positive electrode active material in a ratio of at least 60% by mass. The positive electrode active material layer has a void fraction of less than 20% by volume. Remaining components of the positive electrode active material layer other than the positive electrode active material composed of primary particles include a solid electrolyte.

(2) In the positive electrode for solid-state batteries described in (1), the positive electrode active material layer may contain the positive electrode active material composed of primary particles in a ratio of at least 75% by mass.

(3) In the positive electrode for solid-state batteries described in (2), the positive electrode active material layer may contain the positive electrode active material composed of primary particles in a ratio of at least 90% by mass.

(4) In the positive electrode for solid-state batteries described in any one of (1) to (3), the positive electrode active material may contain Ni, Mn, or Al as a main component.

(5) The present invention also provides a solid-state battery including the positive electrode for solid-state batteries described in any one of (1) to (4).

(6) The present invention also provides a method for producing a solid-state battery. The method includes a pressurization step of pressurizing a stack obtained by disposing a solid electrolyte layer composed of a solid electrolyte between the positive electrode for solid-state batteries described in any one of (1) to (4) and a negative electrode.

(7) In the pressurization step in the method for producing a solid-state battery described in (6), the stack may be pressurized at a pressing force of 1 to 10 ton/cm2.

Effects of the Invention

According to the present invention, it is possible to provide a positive electrode for solid-state batteries, a solid-state battery, and a method for producing a solid-state battery that achieve a high energy density, a high rate capability, and high durability.

More specifically, according to the present invention, the positive electrode active material composed of primary particles is used, and thus the particles do not disintegrate even if the ratio of the positive electrode active material in the electrode is high and pressurization at a high pressure (for example, 10 ton/cm2) is performed thereon.

It is therefore possible to sufficiently ensure a lithium ion path within the positive electrode active material and an ion path between the active material and the solid electrolyte.

As a result, it is possible to increase the energy density of the electrode, and thus it is possible to increase the energy density of the solid-state battery.

Furthermore, since the particles do not disintegrate even if the ratio of the positive electrode active material is high and pressurization at a high pressure is performed thereon, no uncoated portions are newly exposed. Thus, high durability is achieved.

Furthermore, since the positive electrode active material composed of primary particles is used, the active material does not disintegrate at grain boundaries of the active material particles even if the active material expands and contracts during charging and discharging. It is therefore possible to ensure an ion path in the electrode.

PREFERRED MODE FOR CARRYING OUT THE INVENTION

Figure 1:
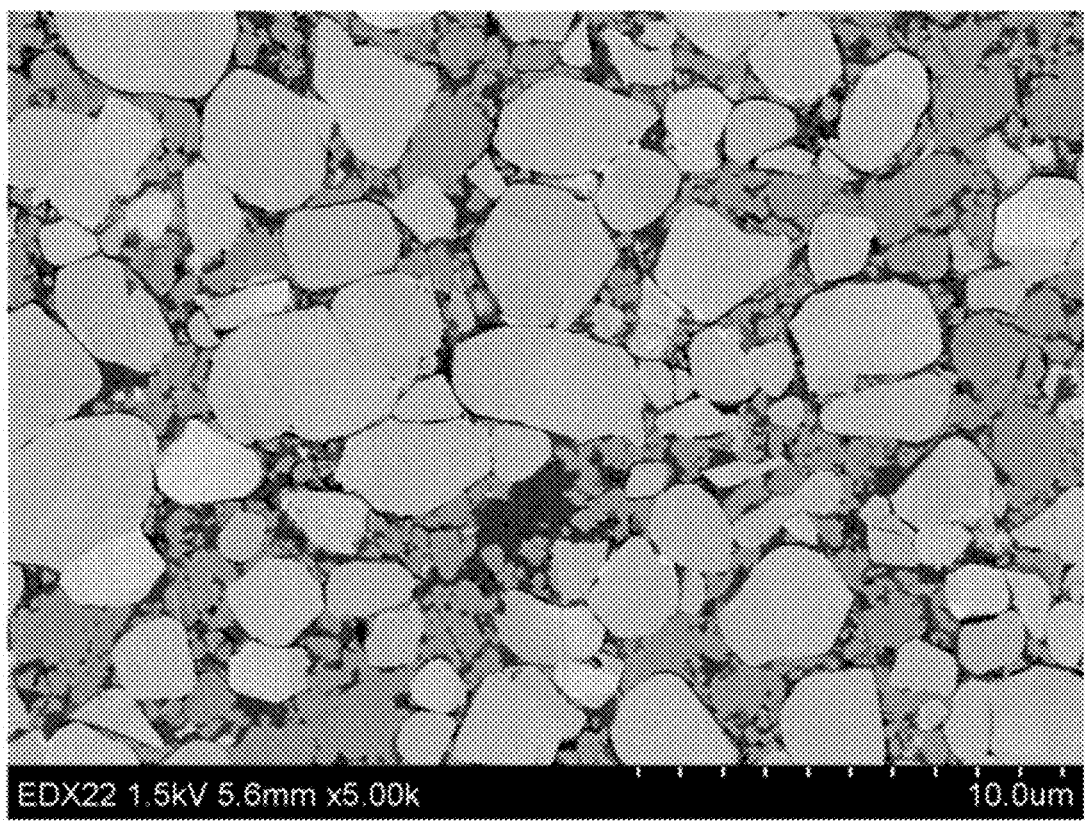
FIG. 1 is an SEM image of a positive electrode active material layer in a cross-section of an electrode according to Example 2.

An embodiment of the present invention will be described in detail with reference to the drawings.

However, the present invention is not limited to the embodiment described below.

Furthermore, in the present specification, the content of any of components of a composition means, in a case where a plurality of substances corresponding to the component are present in the composition, the total amount of the plurality of substances present in the composition, unless specifically stated otherwise.

[Positive Electrode for Solid-State Batteries]

A positive electrode for solid-state batteries according to the present embodiment includes a current collector and a positive electrode active material layer containing a positive electrode active material.

Examples of usable current collectors include aluminum, nickel, and stainless steel.

Alternatively, a porous substrate having electron conductivity may be used as the current collector.

Examples of porous substrates include those formed of carbon or a metal material such as iron, aluminum, titanium, nickel, or stainless steel.

The positive electrode active material layer contains a solid electrolyte, a conductive aid, and a binder in addition to the positive electrode active material.

The positive electrode active material layer is formed through application, onto the current collector, of a positive electrode mixture obtained by mixing the positive electrode active material, the solid electrolyte, the conductive aid, and the binder together, followed by drying and pressurization. Examples of usable solid electrolytes include Li-ion conducting sulfide-based solid electrolytes containing Li, A (A is at least one of P, Si, Ge, Al, and B), and S.

No particular limitations are placed on the materials of the sulfide-based solid electrolytes in the present embodiment. For example, $Li_2S$—$P_2S_5$, $Li_2S$—$P_2S_5$-LiCl, $Li_2S$—$P_2S_5$-LiBr, $Li_2S$—$P_2S_5$-LiI, $Li_2S$—$P_2S_5$-$Li_2O$, $Li_2S$—$P_2S_5$-$Li_2O$—LiI, $Li_{10}GeP_2S_{12}$, and the like are usable.

The solid electrolyte in the present embodiment may be of crystalline material or of amorphous material.

The material of the solid electrolyte may be glass or crystallized glass (glass-ceramic).

Examples of usable conductive aids include natural graphite, artificial graphite, and acetylene black.

Examples of binders include acrylic binders, fluorine-containing binders such as PVDF and PTFE, and rubber binders such as butadiene rubber.

The following describes the positive electrode active material according to the present embodiment in detail.

In the present embodiment, a positive electrode active material composed of primary particles is used as the positive electrode active material.

The positive electrode active material layer contains the positive electrode active material composed of primary particles in a ratio of at least 60% by mass, more preferably at least 75% by mass, and still more preferably at least 90% by mass.

If the ratio of the positive electrode active material composed of primary particles in the positive electrode active material layer is less than 60% by mass, it is impossible to obtain a high energy density.

Furthermore, the positive electrode active material layer has a void fraction of less than 20% by volume.

More preferably, the void fraction is less than 12% by volume. If the void fraction of the positive electrode active material layer is 20% by volume or greater, it is impossible to sufficiently ensure an ion path or an electron path, resulting in a lower energy density and a lower rate capability.

The void fraction can be measured according to the following measurement method.

[1] The true density of each material (the positive electrode active material, the solid electrolyte, the conductive aid, and the binder) contained in the positive electrode mixture is measured using a densitometer adopting a gas displacement method.

[2] An electrode density at zero voids is calculated from the blend ratio and the true density of each material contained in the positive electrode layer.

This is taken to be a calculated density.

[3] The positive electrode mixture obtained by mixing the materials at the respective blend ratios is weighed out in an amount of 500.0 mg.

[4] The positive electrode mixture is placed in a zirconia tube having an inner diameter of 10 mm.

[5] Compression molding is performed using a metal mold through application of a predetermined pressure from above and below, and the thickness of the positive electrode mixture is measured to calculate the electrode density.

This is taken to be a measured density.

[6] The void fraction (% by volume) is 100−((measured density/calculated density)×100).

Furthermore, remaining components of the positive electrode active material layer other than the positive electrode active material composed of primary particles include the solid electrolyte, the conductive aid, and the binder as described above.

That is, the battery according to the present embodiment is a solid-state battery in which a solid electrolyte is used as the electrolyte in the positive electrode.

Furthermore, preferably, the positive electrode active material according to the present embodiment has an average particle size DSEM of 1 to 7 μm based on electron microscope observation, has a ratio (D50/DSEM) of 1 to 3, which is a ratio of a 50% particle size D50 in a volume-based cumulative particle size distribution to the average particle size DSEM, and includes compound particles having a layered structure of at least two transition metals having a ratio (D90/D10) of no greater than 4, which is a ratio of a 90% particle size D90 in a volume-based cumulative particle size distribution to a 10% particle size D10 in the volume-based cumulative particle size distribution.

Preferably, the compound particles having a layered structure of at least two transition metals contain Ni, Mn, or Al as a main component.

In particular, lithium transition metal composite oxide particles (hereinafter, referred to also as "composite oxide particles") having a Ni-containing layered structure are preferably used.

The DSEM being 1 to 7 μm and the D50/DSEM being 1 to 3 mean that the composite oxide particles composing the positive electrode active material are each a non-aggregated particle consisting of one particle or a particle including a small number of primary particles.

That is, the positive electrode active material according to the present embodiment includes a positive electrode active material composed of primary particles.

Accordingly, the positive electrode active material has fewer grain contact boundaries between the primary particles than secondary particles, which are each formed through aggregation of primary particles.

It is to be noted that according to the present embodiment, the term "single particles" is used for both particles that are all non-aggregated particles and particles that each include a small number of primary particles.

Since the positive electrode active material according to the present embodiment includes the positive electrode active material composed of primary particles, the particles therein are not aggregated. Accordingly, the particles do not disintegrate even if pressurization at a high pressure is performed thereon for joining the active material and the solid electrolyte, allowing the solid electrolyte and the conductive aid to cover (adhere to) the entire surface of each particle.

It is therefore possible to efficiently form the electron path and the ion path, and to improve the energy density and the rate capability.

By contrast, secondary particles, which are each formed through aggregation of primary particles, composing a conventional positive electrode active material disintegrate to leave voids between the disintegrated active material particles when pressurization at a high pressure is performed thereon for joining the active material and the solid electrolyte, preventing the solid electrolyte and the conductive aid from covering (adhering to) the entire surface of each primary particle.

It is therefore impossible to efficiently form the electron path and the ion path, and to improve the energy density and the rate capability.

Furthermore, the D90/D10 being no greater than 4 means that the composite oxide particles have a narrow volume-based cumulative particle size distribution and particle sizes thereof are consistent.

This feature allows for increased durability, resulting in increased power output.

It is to be noted here that a positive electrode active material including lithium transition metal composite oxide particles composed of conventional single particles can avoid a reduction in capacity retention, which is caused by breaking of a lithium ion conduction path due to grain boundary dissociation of secondary particles during a charge-discharge cycle, and an increase in lithium ion diffusion/transfer resistance. Such a positive electrode active material therefore has excellent durability compared to a positive electrode active material including lithium transition metal composite oxide particles composed of secondary particles each including a large number of aggregated primary particles.

On the other hand, such a positive electrode active material cannot be designed for high power by utilizing grain boundary conduction, and therefore tends to end up with insufficient power output, because a three-dimensional grain boundary network as in a positive electrode active material composed of aggregated particles is hardly formed.

One possible way to improve the power output is by reducing the particle size (DSEM) of the single particles. However, an overly small particle size can increase interaction between powders, and a resulting decrease in powder fluidity can significantly compromise handleability.

Meanwhile, in order to obtain a practical energy density, particularly, a certain particle size is necessary. However, it is believed that an increased particle size tends to make insufficiency of the rate capability more significant.

Having consistent particle sizes compared to conventional single particles, the lithium transition metal composite oxide particles according to the present embodiment are able to reduce charge-discharge depth variation between particles due to current concentrations in some particles even if charging and discharging are performed at a high current density, and are therefore expected to reduce local deterioration with cycles while preventing a resistance increase due to the current concentrations.

Furthermore, having fewer grain boundaries and consistent particle sizes, the lithium transition metal composite oxide particles do not disintegrate and form favorable interfaces with the solid electrolyte even if pressurization at a high pressure is performed thereon during preparation of the electrode.

This is considered to allow for excellent power output even with the lithium transition metal composite oxide particles having fewer grain contact boundaries between the primary particles.

Generally, the temperature of a heat treatment for particle growth in synthesis of single particles needs to be high.

In the case of a composition that has a high Ni ratio, particularly, sintering at a high temperature can cause incorporation of Ni elements into the Li site, which is referred to as disorder.

The disorder inhibits the diffusion of Li ions in the composite oxide particles to create resistance, having a negative effect such as a decrease in charge-discharge capacity at a practical current density or a decrease in rate capability. It is therefore preferable that the disorder be suppressed.

Suppressing the disorder allows for further increased capacity and power output with single particles.

In view of the durability, the composite oxide particles composing the positive electrode active material preferably have an average particle size DSEM of 1 to 7 μm based on electron microscope observation.

Furthermore, in view of the rate capability and the handleability, the average particle size DSEM is preferably at least 1.1 μm and more preferably at least 1.3 μm, and is preferably no greater than 4 μm and more preferably no greater than 2 μm, in a case where the range of x described below is 0.3≤x<0.6.

In a case where the range of x is 0.6≤x≤0.95, the average particle size DSEM is preferably at least 1.1 μm and more preferably at least 1.3 μm, and is preferably no greater than 5 μm and more preferably no greater than 4 μm.

The average particle size DSEM based on electron microscope observation is determined by observing the particles using a scanning electron microscope (SEM) at a magnification of 1000 to 10000 times depending on the particle size, selecting 100 particles for which outlines thereof are confirmable, calculating equivalent spherical diameters of the selected particles using image processing software, and obtaining an arithmetic mean of the calculated equivalent spherical diameters.

Preferably, the composite oxide particles have a ratio (D50/DSEM) of 1 to 3, which is a ratio of the 50% particle size D50 in the volume-based cumulative particle size distribution to the average particle size DSEM based on electron microscope observation.

A D50/DSEM of 1 indicates that all of the particles are single particles. A D50/DSEM closer to 1 indicates that a smaller number of primary particles are contained.

More preferably, the D50/DSEM is at least 1 and less than 3 in view of the durability. Still more preferably, the D50/DSEM is no greater than 2.5 in view of the rate capability.

Furthermore, the 50% particle size D50 of the composite oxide particles is, for example, 1 to 21 μm. In view of the power density, the 50% particle size D50 is preferably at least 1.5 μm and more preferably at least 3 μm, and is preferably no greater than 8 μm and more preferably no greater than 5.5 μm.

The 50% particle size D50 is determined as a particle size corresponding to a cumulative percentage of 50% from the smaller size side in a volume-based cumulative particle size distribution measured under wet conditions using a laser diffraction particle size distribution analyzer.

Likewise, the 90% particle size D90 and the 10% particle size D10 described below are respectively determined as a particle size corresponding to a cumulative percentage of 90% and a particle size corresponding to a cumulative percentage of 10%.

The ratio of the 90% particle size D90 to the 10% particle size D10 in the volume-based cumulative particle size distribution of the composite oxide particles indicates a span of the particle size distribution, and a smaller value thereof indicates more consistent particle sizes.

Preferably, the D90/D10 is no greater than 4.

Furthermore, in view of the power density, the D90/D10 is preferably no greater than 3, and more preferably no greater than 2.5.

The lower limit of the D90/D10 is, for example, 1.2.

The lithium transition metal composite oxide has a layered structure having a Ni-containing composition.

Examples of such lithium transition metal composite oxides include a lithium-nickel composite oxide and a lithium-nickel-cobalt-manganese composite oxide (NCM ternary system positive electrode active material).

In particular, an NCM ternary system positive electrode active material having a composition represented by formula (1) below is preferably used as the lithium transition metal composite oxide.

[Formula 1]

$$Li_pNi_xCo_yM^1_zO_2+\alpha \quad (1)$$

In the formula (1), p, x, y, z, and a satisfy 1.0≤p≤1.3, 0.3≤x≤0.95, 0≤y≤0.4, 0≤z≤0.5, x+y+z=1, and −0.1≤α≤0.1, and M1 represents at least one of Mn and Al.

The lithium transition metal composite oxide particles may be doped with an element other than the elements forming the lithium transition metal composite oxide.

Examples of doping elements include B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi.

In particular, Mg, Ti, and W are preferable examples.

Examples of compounds usable for doping with the elements listed above include oxides and fluorides containing at least one element selected from the group consisting of the elements listed above, and Li composite oxides thereof.

The doping amount may be, for example, at least 0.005% by mole and no greater than 10% by mole relative to the lithium transition metal composite oxide particles, for example.

Furthermore, the lithium transition metal composite oxide particles may each include a core particle containing a lithium transition metal composite oxide and a deposit disposed on a surface of the core particle.

The deposit may be disposed on at least a partial region of the surface of the core particle and is preferably disposed on a region accounting for at least 1% of the surface area of the core particle.

The deposition has a composition suitably selected in accordance with the purpose and the like, and examples thereof include oxides and fluorides containing at least one element selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, and Li composite oxides thereof.

The deposition may be, for example, contained in the lithium transition metal composite oxide particles in an amount of at least 0.03% by mass and no greater than 10% by mass, and preferably in an amount of at least 0.1% by mass and no greater than 2% by mass.

Preferably, the lithium transition metal composite oxide contains Ni in the composition thereof.

In view of initial efficiency in the solid-state battery, the lithium transition metal composite oxide preferably has an Ni element disorder of no greater than 4.0%, more preferably no greater than 2.0%, and still more preferably no greater than 1.5%, as determined by X-ray diffractometry.

The term "Ni element disorder" as used herein refers to disorder in chemical arrangement (chemical disorder) of transition metal ions (Ni ions) meant to occupy an originally intended site.

A typical Ni element disorder in a lithium transition metal composite oxide having a layered structure is an interchange between lithium ions meant to occupy a site represented by 3b according to the Wyckoff positions (3b site, the same applies hereinafter) and transition metal ions meant to occupy a 3a site.

Preferably, the Ni element disorder is made as low as possible, because a reduction thereof improves the initial efficiency.

The Ni element disorder in the lithium transition metal composite oxide can be determined by X-ray diffractometry.

An X-ray diffraction spectrum of the lithium transition metal composite oxide is measured using CuKα rays.

Structure optimization is performed through Rietveld analysis on the basis of the measured X-ray diffraction spectrum using, as a compositional model, $Li_{1-d}Ni_dMeO_2$ (Me represents a transition metal other than Ni in the lithium transition metal complex oxide).

The percentage of d calculated as a result of the structural optimization is taken to be the value of the Ni element disorder.

In an embodiment of the present invention in which the lithium transition metal composite oxide has a composition represented by the formula (1), the range of a, the ranges of the particle sizes represented by DSEM, D50, D90, and D10, and the more preferable range of the Ni element disorder may vary depending on the value of x in the formula (1). Examples thereof are given below.

In a case where x in the formula (1) satisfies $0.3 \leq x < 0.8$, it is preferable in view of the rate capability that the D50/DSEM be at least 1 and no greater than 2.

In a case where x in the formula (1) satisfies $0.3 < x < 0.6$, it is preferable in view of the rate capability that at least one of the following aspects be fulfilled.
  (i) The Ni element disorder in the lithium transition metal composite oxide particles as determined by X-ray diffractometry is preferably no greater than 1.5% in view of the charge-discharge capacity.
  (ii) The D90/D10 is preferably no greater than 3.0, and more preferably no greater than 2.5.
  (iii) The D50 is preferably at least 1 μm and no greater than 5.5 μm, and more preferably at least 1 μm and no greater than 3 μm in view of the handleability.
  (iv) a in the formula (1) preferably satisfies $1.1 < a < 1.2$.

In a case where x in the formula (1) satisfies $0.6 \leq x < 0.8$, it is preferable in view of the rate capability that at least one of the following aspects be fulfilled.
  (i) The Ni element disorder in the lithium transition metal composite oxide particles as determined by X-ray diffractometry is preferably no greater than 2.0% in view of the charge-discharge capacity.
  (ii) The D90/D10 is preferably no greater than 2.3.
  (iii) The D50 is preferably at least 1 μm and no greater than 5.5 μm in view of the handleability.

In a case where x in the formula (1) satisfies $0.8 \leq x < 0.95$, it is preferable in view of the rate capability that at least one of the following aspects be fulfilled.
  (i) The Ni element disorder in the lithium transition metal composite oxide particles as determined by X-ray diffractometry is preferably no greater than 4.0% in view of the charge-discharge capacity.
  (ii) The D90/D10 is preferably no greater than 3.0.
  (iii) The D50 is preferably at least 1 μm and no greater than 5.5 μm in view of the handleability.

It is to be noted that the surface of each of the particles of the positive electrode active material according to the present embodiment having the features described above is preferably coated with a reaction suppressing layer.

Any coating materials are usable for the present embodiment as long as the coating materials contain a substance having lithium ion conductivity and being capable of maintaining the morphology of the coating layer that does not flow even in contact with the electrode active material or the solid electrolyte.

Examples of such coating materials include $LiNbO_3$, $Li_4Ti_5O_{12}$, and $Li_3PO_4$.

The lithium transition metal composite oxide particles included in the positive electrode active material according to the present embodiment can be produced by a production method including obtaining a raw material mixture by mixing a lithium compound and an oxide having a desired composition, and heat-treating the resulting raw material mixture.

The heat-treated product obtained through the heat treatment may be broken up or washed with water, for example, to remove unreacted materials, by-products, and the like.

In addition, the heat-treated product may be, for example, dispersed or classified.

Examples of methods for obtaining an oxide having a desired composition include: a method in which raw material compounds (a hydroxide, a carbonate compound, and the like) are mixed in accordance with the intended composition and decomposed into an oxide through a heat treatment; and a co-precipitation method in which solvent-soluble raw material compounds are dissolved in a solvent, precipitates of precursors are obtained in accordance with the intended composition through temperature adjustment, pH adjustment, addition of a complexing agent, or the like, and the precursors are heat-treated to yield an oxide.

The following describes an example of a method for producing a positive electrode active material using, as an example, a case where the lithium transition metal composite oxide is represented by the formula (1).

The raw material mixture is obtained by a method preferably including obtaining a composite oxide containing Ni, Co, and at least one of Mn and Al by the co-precipitation method, and mixing the resulting composite oxide with a lithium compound such as lithium carbonate or lithium hydroxide.

The method for obtaining a composite oxide by the co-precipitation method may include a seed formation step of forming seed crystals by adjusting the pH and the like of an aqueous solution mixture containing metal ions in a desired composition, a crystallization step of growing the formed seed crystals to yield a composite hydroxide having desired properties, and a step of heat-treating the resulting composite hydroxide to yield a composite oxide.

For details of the method for obtaining a composite oxide, refer to Japanese Unexamined Patent Application, Publication No. 2003-292322, Japanese Unexamined Patent Application, Publication No. 2011-116580, and the like.

The D90/D10, which is an indicator of particle size distribution, of the composite oxide obtained by the co-precipitation method is, for example, no greater than 3 and preferably no greater than 2.

Furthermore, the D50 is, for example, no greater than 12 μm, preferably no greater than 6 μm, and more preferably no greater than 4 μm. At the same time, the D50 is, for example, at least 1 μm and preferably at least 2 μm.

The content ratio Ni/Co/(Mn+Al) of Ni, Co, and Mn and Al in the composite oxide may be, for example, 1/1/1, 6/2/2, or 8/1/1.

Preferably, the raw material mixture contains a lithium compound in addition to the composite oxide.

Examples of lithium compounds include lithium carbonate, lithium hydroxide, and lithium oxide.

The particle size D50 of the lithium compound to be used is, for example, 0.1 to 100 μm and preferably 2 to 20 μm. The raw material mixture has a lithium content of, for example, at least 1.0 as calculated as Li/(Ni+Co+Mn+Al). At the same time, the lithium content may be no greater than 1.3 and is preferably no greater than 1.2.

The composite oxide and the lithium compound may be, for example, mixed using a mixer such as a high-speed shear mixer.

Heat-treating the raw material mixture obtained yields the lithium transition metal composite oxide particles.

The heat treatment is performed at a temperature of 700° C. to 1100° C., for example.

The heat treatment may be performed at a single temperature or at a plurality of temperatures.

The heat treatment that is performed at a plurality of temperatures may include, for example, a first heat treatment to be performed at a temperature in a range of 700 to 925° C. and a subsequent second heat treatment to be performed at a temperature in a range of 930 to 1100° C.

Furthermore, an additional third heat treatment may be performed at a temperature in a range of 700 to 850° C.

The heat treatment time is, for example, 1 to 40 hours. In the case of the heat treatment that is performed at a plurality of temperatures, the heat treatment time at each temperature may be 1 to 10 hours.

The atmosphere for the heat treatment may be either an air atmosphere or an oxygen atmosphere.

The heat-treated product may be, for example, broken up, dispersed, and classified.

Through the above, desired lithium transition metal composite oxide particles can be obtained.

After the heat-treated product has been broken up, dispersed, and classified, for example, the lithium compound may be further added to give a mixture, and an additional heat treatment may be performed.

In a case where the lithium compound is further added, the lithium content of the resulting mixture may be, for example, 1.05 to 1.3 and is preferably 1.1 to 1.2, as calculated as Li/(Ni+Co+Mn+Al).

Furthermore, the additional heat treatment is preferably performed at a lower temperature than the heat treatment on the raw material mixture. The additional heat treatment may be performed at a temperature in a range of 850 to 1000° C. and is preferably performed at a temperature in a range of 870 to 950° C.

The heat treatment time of the additional heat treatment may be, for example, 2 to 15 hours.

After the additional heat treatment, the heat-treated product may be, for example, broken up, dispersed, and classified.

[Solid-State Battery]

A solid-state battery according to the present embodiment includes, as a positive electrode, the above-described positive electrode for solid-state batteries.

The solid-state battery according to the present embodiment further includes a solid electrolyte as well as a negative electrode. The negative electrode is a conventionally known negative electrode.

As the negative electrode, the solid electrolyte, and the like, for example, those described in publications such as Japanese Unexamined Patent Application, Publication No. 2002-075367, Japanese Unexamined Patent Application, Publication No. 2011-146390, Japanese Unexamined Patent Application, Publication No. 2006-12433, Japanese Unexamined Patent Application, Publication No. 2005-228570, and Japanese Patent No. 5985120 may be used as appropriate. Likewise, as production methods thereof, those described in these publications may be used.

[Method for Producing Solid-State Battery]

A method for producing a solid-state battery according to the present embodiment includes a pressurization step of pressurizing a stack obtained by disposing a solid electrolyte layer composed of a solid electrolyte between the above-described positive electrode for solid-state batteries and a negative electrode, to obtain a solid-state battery.

It is to be noted that the solid electrolyte layer composed of a solid electrolyte and each of the electrodes may be formed by employing any of conventionally known formation methods.

In the pressurization step, the stack is preferably pressurized at a pressing force of 1 to 10 ton/cm2. Since the positive electrode according to the present embodiment includes the positive electrode active material composed of primary particles, the particles do not disintegrate even if the ratio of the positive electrode active material in the electrode is high and pressurization at a pressure as high as 10 ton/cm2 is performed thereon. It is therefore possible to produce a solid-state battery having a high energy density.

According to the present embodiment described above, the positive electrode active material composed of primary particles is used, and thus the particles do not disintegrate even if the ratio of the positive electrode active material in the electrode is high and pressurization at a high pressure (for example, 10 ton/cm2) is performed thereon.

It is therefore possible to sufficiently ensure a lithium ion path within the positive electrode active material and an ion path between the active material and the solid electrolyte.

As a result, it is possible to increase the energy density of the electrode, and thus it is possible to increase the energy density of the solid-state battery.

Furthermore, since the particles do not disintegrate even if the ratio of the positive electrode active material is high and pressurization at a high pressure is performed thereon, no uncoated portions are newly exposed. Thus, high durability is achieved.

Furthermore, since the positive electrode active material composed of primary particles is used, the active material does not disintegrate at grain boundaries of the active material particles even if the active material expands and contracts during charging and discharging. It is therefore possible to ensure an ion path in the electrode.

It is to be noted that the present invention is not limited to the embodiment described above, and modifications and improvements to the extent that the objective of the present invention is achieved are encompassed by the present invention.

EXAMPLES

Next, Examples of the present invention will be described. However, the present invention is not limited to Examples described below.

Example 1

The following describes a preparation example of a positive electrode active material.

(Seed Formation Step)

First, 10 kg of water was charged into a reaction vessel and adjusted under stirring to have an ammonium ion concentration of 1.8% by mass.

The temperature in the reaction vessel was set at 25° C., and the oxygen concentration of the inner space of the vessel was maintained at 10% by volume or lower under nitrogen gas flow. A 25% by mass aqueous sodium hydroxide solution was added to the water in the reaction vessel, and the resulting solution in the vessel was adjusted to a pH value of 13.5 or higher.

Next, an aqueous solution mixture containing a nickel sulfate solution, a cobalt sulfate solution, and a manganese sulfate solution at a ratio by mole of 1:1:1 was prepared by mixing these solutions.

The aqueous solution mixture was added until the solute concentration reached a mole fraction of 4, and seed formation was carried out while the reaction solution was controlled to a pH value of 12.0 or higher with a sodium hydroxide solution.

(Crystallization Step)

After the seed formation step described above, the temperature in the vessel was maintained at 25° C. or higher until the crystallization step was complete.

Furthermore, an aqueous solution mixture having a solute content of 1200 mol was prepared, and the aqueous solution mixture and an aqueous ammonia solution were simultaneously added into the reaction vessel over 5 hours or more so as to prevent further seed formation while the ammonium ion concentration of the solution was maintained at 2000 ppm or higher.

During the reaction, the reaction solution was controlled to maintain a pH value in a range of 10.5 to 12.0 with a sodium hydroxide solution.

Sampling was performed several times during the reaction, and the addition was terminated when the D50 of the resulting composite hydroxide particles reached approximately 3.0 μm.

Next, the product was washed with water, filtered, and dried to collect the composite hydroxide particles.

The resulting hydroxide precursor was heat-treated at 300° C. for 20 hours under an air atmosphere to yield a composite oxide having the following properties: composition ratio Ni/Co/Mn=0.33/0.33/0.33, D10=2.2 μm, D50=3.0 μm, D90=4.1 μm, and D90/D10=1.9.

(Synthesis Step)

The thus obtained composite oxide and lithium carbonate were mixed so as to satisfy Li/(Ni+Co+Mn)=1.05 to yield a raw material mixture.

The resulting raw material mixture was sintered under an air atmosphere at 925° C. for 7.5 hours, and then sintered at 1030° C. for 6 hours to give a sintered product.

The resulting sintered product was broken up, dispersed for 30 minutes using a resin ball mill, and dry-sieved to collect a powder.

The resulting powder was mixed with lithium carbonate so as to satisfy Li/(Ni+Co+Mn)=1.17, and the resulting mixture was sintered under an air atmosphere at 900° C. for 10 hours to give a sintered product.

The resulting sintered product was broken up, dispersed for 30 minutes using a resin ball mill, and dry-sieved to collect a powder.

Through the above, lithium transition metal composite oxide particles represented by a composition formula Li1.15Ni0.33Co0.33Mn0.33O2 and having the following properties were obtained: an average particle size DSEM of 1.2 μm, D10=1.5 μm, D50=3.4 μm, D90=5.1 μm, a ratio D50/DSEM of the D50 to the average particle size DSEM of 2.8, and a ratio D90/D10 in the particle size distribution of 3.4.

(Coating Step)

First, a precursor solution of an LiNbO3 reaction suppressing layer was prepared.

The precursor solution of the LiNbO3 reaction suppressing layer was prepared by dissolving 31.1 g of LiOC2H5 in 887 g of an ethanol solvent so that ethanol would contain 0.6 mol/L of lithium ethoxide LiOC2H5 and 0.6 mol/L of niobium pentaethoxide Nb(OC2H5)5, and then adding and dissolving 190.9 g of Nb(OC2H5)5.

Coating of the precursor solution of the reaction suppressing layer onto an active material was performed using a tumbling fluidized bed coater.

As a positive electrode active material powder, 1250 g of Li1.15Ni0.33Co0.33Mn0.33O2 single particles were placed in the tumbling fluidized bed coater, and dry air at 50° C. was introduced as fluidizing gas at 0.25 m3/minute.

While the positive electrode active material powder was swirled up by the dry air and circulated within the tumbling fluidized bed coater, the precursor solution prepared was sprayed thereon through a spray nozzle at 4 g/minute.

The tumbling fluidized bed coater was operated for 8 hours to yield the positive electrode active material powder coated with the precursor of the LiNbO3 reaction suppressing layer.

The positive electrode active material powder coated with the precursor of the LiNbO3 reaction suppressing layer was heat-treated under an air atmosphere at 350° C. for 5 hours using an electric furnace to yield positive electrode active material particles each coated with the LiNbO3 reaction suppressing layer.

Cross-sections of the resulting positive electrode active material particles were observed using a transmission electron microscope to find that the LiNbO3 reaction suppressing layers coating the Li1.15Ni0.33Co0.33Mn0.33O2 single particles had an average thickness of 15 nm.

Through the above, an NCM ternary system positive electrode active material having a coating layer was obtained.

(Preparation of Sulfide Solid Electrolyte Material)

As described in the specification of Japanese Patent Application No. 2015-130247, for example, a sulfide solid electrolyte material can be prepared by a known method.

Specifically, Li2S, P2S5, LiI, and LiBr were weighed out so as to satisfy a composition 10LiI·15LiBr·75 (0.75Li2S·0.25P2S5), and mixed using an agate mortar for 5 minutes.

Into a container for a planetary ball mill, 2 g of the resulting mixture was added, dry heptane was added, and ZrO2 balls were further added. The container was then completely sealed.

The container was attached to the planetary ball mill, and mechanical milling was performed at a disc revolution speed of 500 rpm for 20 hours.

Thereafter, heptane was removed through drying performed at 110° C. for 1 hour to give a coarse grain material of the sulfide solid electrolyte material.

Thereafter, the resulting coarse grain material was finely pulverized.

The coarse grain material was mixed with dry heptane and dibutyl ether, and adjusted to have a total amount of 10 g and a solid concentration of 10% by mass.

Into a container for a planetary ball mill, the resulting mixture was added, and ZrO2 balls were further added. The container was then completely sealed.

The container was attached to the planetary ball mill, and mechanical milling was performed at a disc revolution speed of 150 rpm for 20 hours.

Thereafter, drying was performed to yield an amorphous sulfide solid electrolyte material (D50=0.8 μm).

The amorphous sulfide solid electrolyte material was sintered at 200° C. to yield a sulfide solid electrolyte material being glass-ceramic.

The NCM ternary system positive electrode active material (D50=3.4 μm) prepared in the preparation example described above and composed of primary particles, the sulfide-based solid electrolyte (D50=0.8 μm), and acetylene black serving as a conductive aid were weighed out so as to give a ratio of 60% by mass, a ratio of 34% by mass, and a ratio of 6% by mass, respectively, and a total amount of 20 g, added into a container of a planetary ball mill, and mixed.

The mixing was performed at 100 rpm for 2 hours.

Thus, a positive electrode mixture including a positive electrode for solid-state batteries was prepared.

Next, 50 mg of a solid electrolyte, which was the sulfide-based solid electrolyte (D50=0.8 μm) used in the preparation of the positive electrode mixture, was placed in a zirconia tube having an inner diameter of 10 mm, and compression molding was performed at 1.5 ton/cm2 using a metal mold. Through the above, a solid electrolyte layer composed of the solid electrolyte was formed.

Next, 8.2 mg of the above-described positive electrode mixture was weighed out and added into a metal mold, and compression molding was performed at 1.5 ton/cm2.

Next, on top of a positive electrode layer obtained through the compression molding, 20 μm-thick aluminum foil punched into a 10 mm circle was placed.

Through the above, a positive electrode was formed.

Hard carbon (D50=9.0 μm) serving as a negative electrode active material and the sulfide-based solid electrolyte (D50=0.8 μm) prepared in the preparation example described above were weighed out so as to give a ratio of 55% by mass and a ratio of 45% by mass, respectively, and a total amount of 20 g, added into a container of a planetary ball mill, and mixed.

The mixing was performed at 100 rpm for 4 hours.

Thus, a negative electrode mixture including a negative electrode for solid-state batteries was prepared.

Next, 4.2 mg of the negative electrode mixture was weighed out and added into a metal mold, and compression molding was performed at 1.5 ton/cm2.

Next, on top of a negative electrode layer obtained through the compression molding, 10 μm-thick copper foil punched into a 10 mm circle was placed.

Through the above, a negative electrode was formed.

Next, compression molding was performed at 10 ton/cm2 using a metal mold on a stack obtained by disposing the above-described solid electrolyte layer between the above-described positive electrode and the negative electrode.

Through the above, a solid-state battery was obtained.

Example 2

Using the positive electrode active material described in Example 1, a solid-state battery was obtained in the same manner as in Example 1 except that the ratio of the positive electrode active material was changed to 75% by mass, the ratio of the solid electrolyte was changed to 22% by mass, the ratio of the conductive aid was changed to 3% by mass, and 5.3 mg of the negative electrode mixture was weighed out and placed in a metal mold.

Example 3

Using the positive electrode active material described in Example 1, a solid-state battery was obtained in the same manner as in Example 1 except that the ratio of the positive electrode active material was changed to 80% by mass, the ratio of the solid electrolyte was changed to 18% by mass, the ratio of the conductive aid was changed to 2% by mass, and 5.7 mg of the negative electrode mixture was weighed out and placed in a metal mold.

Example 4

Using the positive electrode active material described in Example 1, a solid-state battery was obtained in the same manner as in Example 1 except that the ratio of the positive electrode active material was changed to 85% by mass, the ratio of the solid electrolyte was changed to 13.5% by mass, the ratio of the conductive aid was changed to 1.5% by mass, and 6.0 mg of the negative electrode mixture was weighed out and placed in a metal mold.

Example 5

Using the positive electrode active material described in Example 1, a solid-state battery was obtained in the same manner as in Example 1 except that the ratio of the positive electrode active material was changed to 90% by mass, the ratio of the solid electrolyte was changed to 10% by mass, the ratio of the conductive aid was changed to 0% by mass, and 6.4 mg of the negative electrode mixture was weighed out and placed in a metal mold.

Example 6

A solid-state battery was obtained in the same manner as in Example 1 except that compression molding was performed at 4.5 ton/cm2 using a metal mold on the stack obtained by disposing the solid electrolyte layer between the positive electrode and the negative electrode described in Example 1.

Example 7

A solid-state battery was obtained in the same manner as in Example 1 except that compression molding was performed at 3.0 ton/cm2 using a metal mold on the stack obtained by disposing the solid electrolyte layer between the positive electrode and the negative electrode described in Example 1.

Example 8

A solid-state battery was obtained in the same manner as in Example 1 except that compression molding was performed at 2.2 ton/cm2 using a metal mold on the stack obtained by disposing the solid electrolyte layer between the positive electrode and the negative electrode described in Example 1.

Example 9

A solid-state battery was obtained in the same manner as in Example 2 except that compression molding was performed at 4.5 ton/cm2 using a metal mold on the stack obtained by disposing the solid electrolyte layer between the positive electrode and the negative electrode described in Example 2.

Example 10

A solid-state battery was obtained in the same manner as in Example 3 except that compression molding was performed at 4.5 ton/cm2 using a metal mold on the stack obtained by disposing the solid electrolyte layer between the positive electrode and the negative electrode described in Example 3.

Example 11

A solid-state battery was obtained in the same manner as in Example 4 except that compression molding was performed at 4.5 ton/cm2 using a metal mold on the stack obtained by disposing the solid electrolyte layer between the positive electrode and the negative electrode described in Example 4.

Example 12

A solid-state battery was obtained in the same manner as in Example 5 except that compression molding was performed at 4.5 ton/cm2 using a metal mold on the stack obtained by disposing the solid electrolyte layer between the positive electrode and the negative electrode described in Example 5.

Comparative Example 1

A composite oxide was obtained under the same conditions as in Example 1.

The resulting composite oxide was mixed with lithium carbonate so as to satisfy Li/(Ni+Co+Mn)=1.15 to yield a raw material mixture.

The resulting raw material mixture was sintered under an air atmosphere at 950° C. for 15 hours to give a sintered product. The resulting sintered product was broken up, dispersed for 10 minutes using a resin ball mill, and dry-sieved to collect a powder.

Through the above, lithium transition metal composite oxide particles represented by a composition formula $Li_{1.15}Ni_{0.33}Co_{0.33}Mn_{0.33}O_2$ and having the following properties were obtained: an average particle size DSEM of 0.8 μm, D10=3.0 μm, D50=4.0 μm, D90=7.6 μm, a ratio D50/DSEM of the D50 to the average particle size DSEM of 5.0, and a ratio D90/D10 in the particle size distribution of 2.5.

The coating step was also performed under the same conditions as in Example 1.

A solid-state battery was obtained in the same manner as in Example 1 except that the NCM ternary system positive electrode active material (D50=4.0 μm) obtained in the preparation example described above and composed of secondary particles was used as a positive electrode active material.

Comparative Example 2

Using, as a positive electrode active material, the NCM ternary system positive electrode active material (D50=4.0 μm) composed of secondary particles, a solid-state battery was obtained in the same manner as in Comparative Example 1 except that the ratio of the positive electrode active material was changed to 75% by mass, the ratio of the solid electrolyte was changed to 22% by mass, the ratio of the conductive aid was changed to 3% by mass, and 5.3 mg of the negative electrode mixture was weighed out and placed in a metal mold.

Comparative Example 3

Using, as a positive electrode active material, the NCM ternary system positive electrode active material (D50=4.0 μm) composed of secondary particles, a solid-state battery was obtained in the same manner as in Comparative Example 1 except that the ratio of the positive electrode active material was changed to 85% by mass, the ratio of the solid electrolyte was changed to 13.5% by mass, the ratio of the conductive aid was changed to 1.5% by mass, and 6.0 mg of the negative electrode mixture was weighed out and placed in a metal mold.

Comparative Example 4

Using, as a positive electrode active material, the NCM ternary system positive electrode active material (D50=4.0 μm) composed of secondary particles, a solid-state battery was obtained in the same manner as in Comparative Example 1 except that the ratio of the positive electrode active material was changed to 90% by mass, the ratio of the solid electrolyte was changed to 10% by mass, the ratio of the conductive aid was changed to 0% by mass, and 6.4 mg of the negative electrode mixture was weighed out and placed in a metal mold.

Comparative Example 5

A solid-state battery was obtained in the same manner as in Comparative Example 1 except that compression molding was performed at 4.5 ton/cm2 using a metal mold on the stack obtained by disposing the solid electrolyte layer between the positive electrode and the negative electrode in Comparative Example 1.

Comparative Example 6

A solid-state battery was obtained in the same manner as in Comparative Example 2 except that compression molding was performed at 4.5 ton/cm2 using a metal mold on the stack obtained by disposing the solid electrolyte layer between the positive electrode and the negative electrode in Comparative Example 2.

Comparative Example 7

A solid-state battery was obtained in the same manner as in Comparative Example 3 except that compression molding was performed at 4.5 ton/cm2 using a metal mold on the stack obtained by disposing the solid electrolyte layer between the positive electrode and the negative electrode in Comparative Example 3.

Comparative Example 8

A solid-state battery was obtained in the same manner as in Comparative Example 4 except that compression molding was performed at 4.5 ton/cm2 using a metal mold on the stack obtained by disposing the solid electrolyte layer between the positive electrode and the negative electrode in Comparative Example 4.

Comparative Example 9

A solid-state battery was obtained in the same manner as in Example 1 except that compression molding was performed at 1.5 ton/cm2 using a metal mold on the stack obtained by disposing the solid electrolyte layer between the positive electrode and the negative electrode in Example 1.

[Evaluation]

First, magnified observation was performed using a scanning electron microscope (SEM) on the positive electrode active material layer of the solid-state battery obtained in each of Examples and Comparative Examples.

Figure 2:
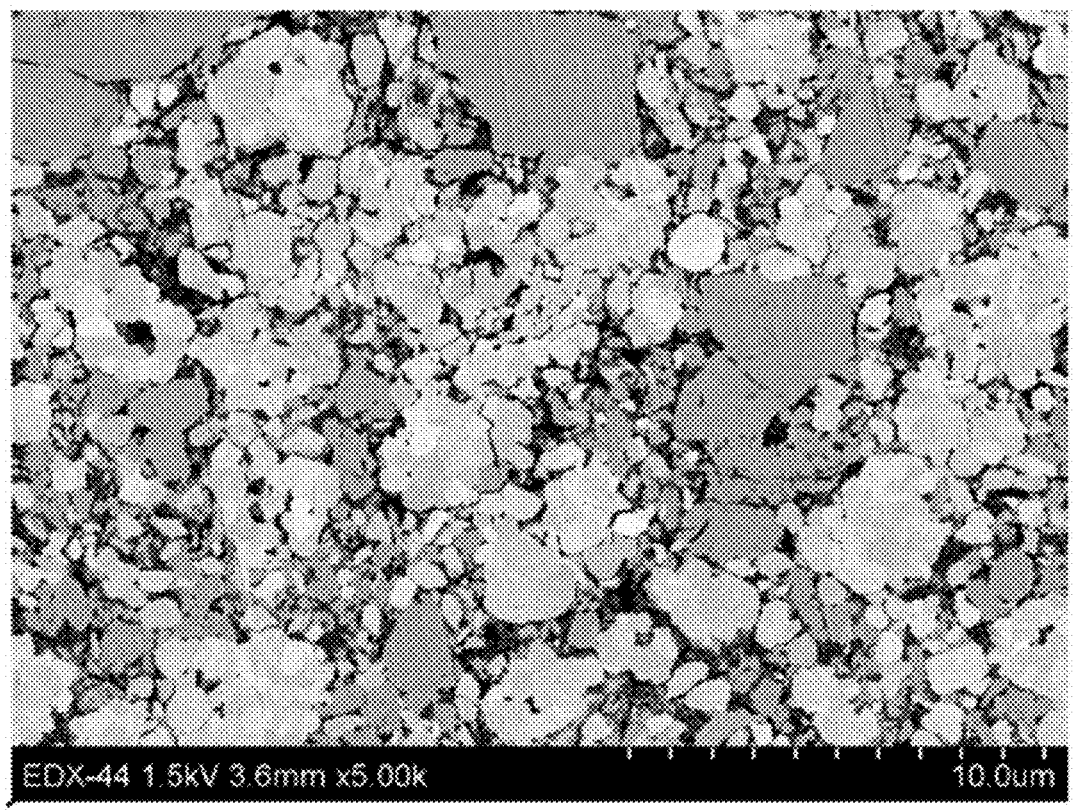
FIG. 2 is an SEM image of a positive electrode active material layer in a cross-section of an electrode according to Comparative Example 2.
Figure 3:
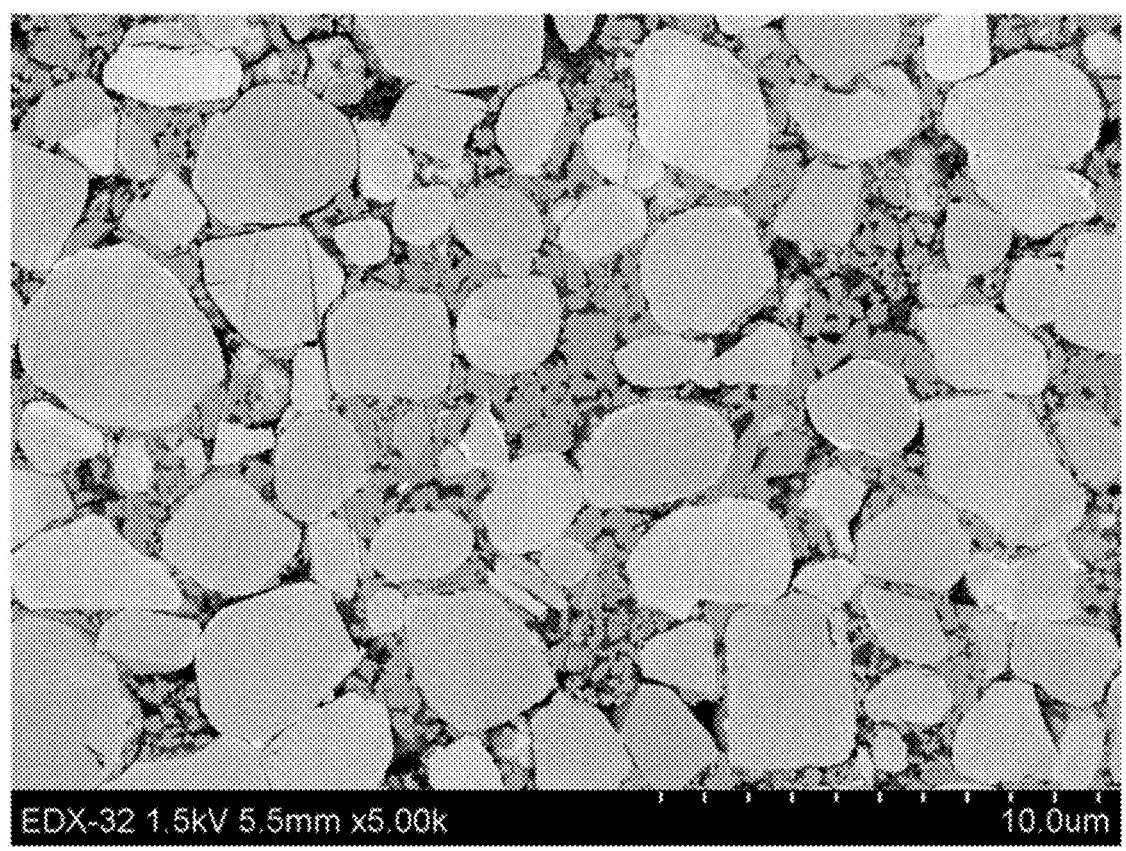
FIG. 3 is an SEM image of a positive electrode active material layer in a cross-section of an electrode according to Example 4.

FIGS. 1 to 3 show results thereof.

It is to be noted here that FIG. 1 is an SEM image of the positive electrode active material layer according to Example 2.

FIG. 2 is an SEM image of the positive electrode active material layer according to Comparative Example 2.

FIG. 3 is an SEM image of the positive electrode active material layer according to Example 4.

As indicated in FIGS. 1 and 3, the positive electrode active material layers according to Examples 2 and 4, in which primary particles were used as the positive electrode active material, were each confirmed to have successfully prevented the active material particles from disintegrating and maintained the interface with the solid electrolyte despite a high positive electrode active material ratio.

By contrast, as shown in FIG. 2, the positive electrode active material layer according to Comparative Example 2, in which secondary particles were used as the positive electrode active material, was confirmed to have failed to maintain the interface with the solid electrolyte, with the active material particles disintegrated.

Furthermore, the disintegration of the particles was confirmed to become more significant with an increase in the positive electrode active material ratio.

Next, the energy density of the solid-state battery obtained in each of Examples and Comparative Examples was measured.

Specifically, after the compression molding had been performed on the positive electrode mixture described in each of Examples and Comparative Examples at the ultimately applied maximum pressure (10 ton/cm2 in Example 1, 4.5 ton/cm2 in Example 6), the thickness of the resulting positive electrode was measured.

Each of the solid-state batteries was charged and discharged in a charge-discharge voltage range of 4.2 to 2.4 V at 25° C. at a current value equivalent to 0.1 C.

As a result, a charge-discharge amount Wh was obtained. The energy density (mWh/cc) of each of the solid-state batteries was calculated from the charge-discharge amount Wh and the thickness of the electrode.

Furthermore, the durability (cycle characteristics) of the solid-state battery obtained in each of Examples and Comparative Examples was measured.

Specifically, each of the solid-state batteries was subjected to 225 charge-discharge cycles in total.

More specifically, each of the solid-state batteries was charged and discharged in a charge-discharge voltage range of 4.2 to 2.4 V at 60° C. at a current value equivalent to 0.1 C for the first cycle, the 100th cycle, and the 225th cycle, and was charged and discharged in a charge-discharge voltage range of 4.2 to 2.4 V at 60° C. at a current value equivalent to 1 C for the second to 99th cycles and the 101st to 224th cycles. As a result, a discharge capacity (mAh/g) per positive electrode active material was obtained. The durability (cycle characteristics) of each of the solid-state batteries was evaluated on the basis of the discharge capacity.

Furthermore, the rate capability of the solid-state battery obtained in each of Examples and Comparative Examples was measured.

Specifically, each of the solid-state batteries was charged up to 4.2 V at 25° C. at a current value equivalent to 0.1 C, and was discharged to 2.4 V at 25° C. at a current value equivalent to 0.1 C.

Next, the solid-state battery was charged up to 4.2 V at 25° C. at a current value equivalent to 0.1 C, and was discharged to 2.4 V at 25° C. at a current value equivalent to 3 C. The rate capability retention was calculated from a ratio (3 C capacity/0.1 C capacity×100) between capacities respectively obtained at 0.1 C and 3 C.

Table 1 below shows evaluation results obtained.

It should be noted here that Table 1 shows comparisons between the evaluation results of Examples and the evaluation results of Comparative Examples.

As the durability, the discharge capacity retention upon the 225th cycle relative to the first cycle is shown.

TABLE 1

| | Active material blend ratio (% by mass) | $D_{SEM}$ (μm) | $D_{50}$ (μm) | $D_{50}/D_{SEM}$ | $D_{90}/D_{10}$ | Void fraction (%) | Energy density (mWh/cc) | Rate capability 3 C/0.1 C | Durability (%) |
|---|---|---|---|---|---|---|---|---|---|
| Example1 | 60 | 1.2 | 3.4 | 2.8 | 3.4 | 1.2 | 987 | 88 | 98 |
| Example2 | 75 | | | | | 2 | 1382 | 88 | 98 |
| Example3 | 80 | | | | | 4.9 | 1497 | 85 | 98 |
| Example4 | 85 | | | | | 8.3 | 1617 | 80 | 97 |
| Example5 | 90 | | | | | 11 | 1410 | 65 | 96 |
| Example6 | 60 | | | | | 8.2 | 892 | 86 | 97 |
| Example7 | 60 | | | | | 14.3 | 839 | 85 | 96 |
| Example8 | 60 | | | | | 16.9 | 813 | 80 | 90 |
| Example9 | 75 | | | | | 12.7 | 1249 | 84 | 96 |

TABLE 1-continued

| | Active material blend ratio (% by mass) | $D_{SEM}$ (μm) | $D_{50}$ (μm) | $D_{50}/D_{SEM}$ | $D_{90}/D_{10}$ | Void fraction (%) | Energy density (mWh/cc) | Rate capability 3 C/0.1 C | Durability (%) |
|---|---|---|---|---|---|---|---|---|---|
| Example10 | 80 | | | | | 13.7 | 1362 | 80 | 95 |
| Example11 | 85 | | | | | 15.6 | 1489 | 75 | 93 |
| Example12 | 90 | | | | | 19.3 | 1303 | 55 | 90 |
| Comparative Example1 | 60 | 0.8 | 4 | 5 | 2.5 | 3 | 864 | 70 | 82 |
| Comparative Example2 | 75 | | | | | 2.6 | 1004 | 55 | 80 |
| Comparative Example3 | 85 | | | | | 8.9 | 751 | 40 | 70 |
| Comparative Example4 | 90 | | | | | 10.5 | 686 | 20 | 60 |
| Comparative Example5 | 60 | | | | | 13.2 | 792 | 60 | 78 |
| Comparative Example6 | 75 | | | | | 15.3 | 936 | 48 | 75 |
| Comparative Example7 | 85 | | | | | 20.9 | 652 | 32 | 68 |
| Comparative Example8 | 90 | | | | | 20.8 | 622 | 15 | 60 |
| Comparative Example9 | 60 | 1.2 | 3.4 | 2.8 | 3.4 | 21.1 | 772 | 68 | 80 |

As is apparent from Table 1, the solid-state batteries according to Examples, in which primary particles were used as the positive electrode active material, were confirmed to result in a high energy density and a high rate capability compared to the solid-state batteries according to Comparative Examples, in which secondary particles were used as the positive electrode active material.

Furthermore, comparisons between Comparative Example 9 and Examples 1, 6, 7, and 8 have confirmed that a high energy density and a high rate capability are maintained as long as the positive electrode layer has a void fraction of less than 20%.

Furthermore, as is apparent from comparisons of the durability in Table 1, the solid-state batteries according to Comparative Examples 1 to 8, in which secondary particles were used as the positive electrode active material, and Comparative Example 9, in which primary particles were used but the void fraction was greater than 20%, were all confirmed to have been greatly reduced in discharge capacity retention after the 225th cycle, while the solid-state batteries according to Examples, in which primary particles were used as the positive electrode active material, all had a discharge capacity retention of as high as approximately 90% or higher after the 225th cycle.

These results have confirmed that the solid-state batteries according to Examples achieve high durability.

Furthermore, as is apparent from Table 1, unlike the solid-state batteries according to Comparative Examples, in which secondary particles were used as the positive electrode active material, the solid-state batteries according to Examples, in which primary particles were used as the positive electrode active material, were confirmed to result in a high energy density and a high power density even if the ratio of the positive electrode active material in the positive electrode active material layer is 60% by mass or greater.

Particularly, in the cases where the ratio of the positive electrode active material in the positive electrode active material layer was 75% by mass or greater, the energy density slightly increased or greatly decreased in Comparative Examples, while, on the contrary, the energy density increased in Examples.

The invention claimed is:

1. A positive electrode for solid-stage batteries, comprising:
   a current collector; and
   a positive electrode active material layer containing a positive electrode active material, wherein
   the positive electrode active material layer contains the positive electrode active material in a ratio of at least 60% by mass relative to a total amount of the positive electrode active material layer, the positive electrode active material layer has a void fraction of less than 20% by volume, and
   remaining components of the positive electrode active material layer other than the positive electrode active material include a solid electrolyte,
   average particle size DSEM is 1 to 7 μm based on electron microscope observation, and
   a ratio (050/DSEM) of a 50% particle size D50 in a volume-based cumulative particle size distribution measured using a laser diffraction particle size distribution analyzer relative to the average particle size (DSEM) is 1 to 3.

2. The positive electrode for solid-state batteries according to claim 1, wherein the positive electrode active material layer contains the positive electrode active material in a ratio of at least 75% by mass relative to a total amount of the positive electrode active material layer.

3. The positive electrode for solid-state batteries according to claim 2, wherein the positive electrode active material layer contains the positive electrode active material in a ratio of at least 90% by mass relative to a total amount of the positive electrode active material layer.

4. The positive electrode for solid-state batteries according to claim 1, wherein the positive electrode active material contains Ni, Mn, or Al as a main component.

5. A solid-state battery comprising the positive electrode for solid-state batteries according to claim 1.

6. A method for producing a solid-state battery, comprising a pressurization step of pressurizing a stack obtained by disposing a solid electrolyte layer composed of a solid electrolyte between the positive electrode for solid-state batteries according to claim 1 and a negative electrode.

7. The method for producing a solid-state battery according to claim 6, wherein in the pressurization step, the stack is pressurized at a pressing force of 1 to 10 ton/cm2.

8. The positive electrode for solid-state batteries according to claim 2, wherein the positive electrode active material contains Ni, Mn, or Al as a main component.

9. The positive electrode for solid-state batteries according to claim 3, wherein the positive electrode active material contains Ni, Mn, or Al as a main component.

10. A solid-state battery comprising the positive electrode for solid-state batteries according to claim 2.

11. A solid-state battery comprising the positive electrode for solid-state batteries according to claim 3.

12. A solid-state battery comprising the positive electrode for solid-state batteries according to claim 4.

13. A method for producing a solid-state battery, comprising a pressurization step of pressurizing a stack obtained by disposing a solid electrolyte layer composed of a solid electrolyte between the positive electrode for solid-state batteries according to claim 2 and a negative electrode.

14. A method for producing a solid-state battery, comprising a pressurization step of pressurizing a stack obtained by disposing a solid electrolyte layer composed of a solid electrolyte between the positive electrode for solid-state batteries according to claim 3 and a negative electrode.

15. A method for producing a solid-state battery, comprising a pressurization step of pressurizing a stack obtained by disposing a solid electrolyte layer composed of a solid electrolyte between the positive electrode for solid-state batteries according to claim 4 and a negative electrode.

* * * * *